(12) United States Patent
McDaniel

(10) Patent No.: US 7,762,211 B1
(45) Date of Patent: Jul. 27, 2010

(54) PET FEEDING AND WATERING APPARATUS

(76) Inventor: Kevin M. McDaniel, 39122 Loren Way, Temecula, CA (US) 92592

(\*) Notice: Subject to any disclaimer, the term of this patent is extended or adjusted under 35 U.S.C. 154(b) by 157 days.

(21) Appl. No.: 12/189,570

(22) Filed: Aug. 11, 2008

(51) Int. Cl.
*A01K 1/10* (2006.01)
(52) U.S. Cl. ........................... 119/51.5; 119/73
(58) Field of Classification Search ............ 119/5.11, 119/51.5, 57.92, 61.5, 61.55, 61.52, 72, 73, 119/74, 78
See application file for complete search history.

(56) References Cited

U.S. PATENT DOCUMENTS

| | | | | |
|---|---|---|---|---|
| 2,997,022 | A | * 8/1961 | Kay | 119/61.31 |
| 3,491,723 | A | * 1/1970 | Soukeras | 119/51.12 |
| 3,572,054 | A | * 3/1971 | Curcio | 62/390 |
| 3,631,840 | A | * 1/1972 | McCormack | 119/51.12 |
| 3,638,618 | A | * 2/1972 | Strother | 119/51.12 |
| 3,650,247 | A | 3/1972 | McKinstry | |
| 3,802,395 | A | 4/1974 | von Taschitzki | |
| 4,509,460 | A | * 4/1985 | Seltzer | 119/74 |
| 4,633,815 | A | * 1/1987 | Peterson et al. | 119/72 |
| 4,646,687 | A | * 3/1987 | Peterson et al. | 119/73 |
| D289,808 | S | 5/1987 | Gardner | |
| 4,699,089 | A | * 10/1987 | Teschke | 119/51.5 |
| 4,883,022 | A | * 11/1989 | Barker | 119/73 |
| 4,922,858 | A | * 5/1990 | Ahrens | 119/73 |
| 5,174,245 | A | * 12/1992 | Bishop | 119/73 |
| 5,819,686 | A | 10/1998 | Credeur | |
| D408,225 | S | * 4/1999 | Hodosh | D7/605 |
| 6,279,508 | B1 | 8/2001 | Marchant et al. | |
| 6,463,880 | B1 | 10/2002 | Callingham | |
| 6,622,657 | B2 | 9/2003 | Northrop et al. | |
| 7,152,550 | B2 | 12/2006 | Walker | |

\* cited by examiner

*Primary Examiner*—Rob Swiatek
*Assistant Examiner*—Ebony Evans
(74) *Attorney, Agent, or Firm*—Crossley Patent Law; Mark A. Crossley

(57) ABSTRACT

The pet feeding and watering apparatus provides pet food and water in the same cabinet. The apparatus provides constant temperature control of the chilled water, with auto recirculation and filtration, thereby preventing algae and bacterial growth. The vertical guide float assembly ensures correct water level within the water reservoir. The adjustable thermostat senses water warmth and initiates operation of the switched valve and the chiller with pump. The apparatus also provides a fingertip controlled feeding assembly. The feeding assembly is removable by a human but not by a pet, which is a key factor, as many pets are playfully destructive of such items.

1 Claim, 6 Drawing Sheets

PET FEEDING AND WATERING APPARATUS

BACKGROUND OF THE INVENTION

The difficulties involved in automated pet feeding and watering are well known, with various attempts at solving these difficulties frequently presented. One problem includes having separate watering and feeding devices. An even partially portable food bowl, for example, is often carried away and used as a toy by many pets, requiring the caregiver to search for the bowl and often to replace the bowl. Fully portable separate bowls often are used as chew toys by dogs, for further example. Problems associated with automatic watering devices include complexity, lack of filtration, algae and bacterial growth, automatic filling mechanisms, and float designs used in some, as example of just some of the issues to be addressed. As further example of a problem with watering an animal, warm or even hot water is often the only water offered to a pet. However, like us, in temperate conditions a pet also enjoys and even often needs cool water. Additionally, hot water encourages algae and bacterial growth.

The present apparatus provides filtered automatically filled cool water which is recirculated to remain chilled and filtered, with a reliable float device. The apparatus includes an integrated feeding bowl supplied by a finger controlled feeding assembly.

FIELD OF THE INVENTION

The pet feeding and watering apparatus relates to automated watering and feeding devices for pets and more especially to a pet feeding and watering apparatus with automatic water chilling, filling, and recirculation, with fingertip controlled pet feeding assembly, all in a single cabinet.

SUMMARY OF THE INVENTION

The general purpose of the pet feeding and watering apparatus, described subsequently in greater detail, is to provide a pet feeding and watering apparatus which has many novel features that result in an improved pet feeding and watering apparatus which is not anticipated, rendered obvious, suggested, or even implied by prior art, either alone or in combination thereof.

To attain this, the pet feeding and watering apparatus provides pet food and water in the same cabinet. Chilled water is provided to the pet, a particularly important feature in warm times and climates. The apparatus provides constant temperature control of the chilled water.

The chilled water is not only more pleasant for a pet but also prevents algae and bacteria growth in the water, as warm water provides a favorable environment for such undesirable growth. Water is also filtered to inhibit undesirable algae and bacteria formation and accumulation. Charcoal is the preferred filter ingredient. The float assembly ensures correct water level within the water reservoir. The adjustable thermostat senses water warmth and initiates operation of the switched valve and the chiller with pump. Water is recirculated through the filter and the reservoir to purify the water and to bring the water to the desired temperature. The pet's water therefore does not have to be constantly tended, but regulates itself regarding level, temperature, and purity. The apparatus also provides a fingertip controlled feeding assembly. The assembly is removable by a human but not by a pet. Removability provides for cleaning and replacement. The food canister is also removable for filling and cleaning. The food bowl and water reservoir are not removable by a pet, which is a key factor, as many pets are playfully destructive of such items. The storage cavity provides for storage of any given item and also can also provide shelter for a pet.

Thus has been broadly outlined the more important features of the improved pet feeding and watering apparatus so that the detailed description thereof that follows may be better understood and in order that the present contribution to the art may be better appreciated.

An object of the pet feeding and watering apparatus is to provide pet food and water in the same cabinet.

Another object of the pet feeding and watering apparatus is to provide chilled water to the pet.

A further object of the pet feeding and watering apparatus is to constant temperature control of the chilled water.

An added object of the pet feeding and watering apparatus is to prevent algae and bacteria growth in the water.

And, an object of the pet feeding and watering apparatus is to provide automatic water bowl filling.

Yet another object of the pet feeding and watering apparatus is to provide a fingertip controlled feeding assembly for a pet.

Still another object of the pet feeding and watering apparatus is to provide a removable feeding assembly.

And, a further object of the pet feeding and watering apparatus is to ensure that a pet cannot remove the food bowl.

Further, an object of the pet feeding and watering apparatus is to selectively provide pet shelter.

These together with additional objects, features and advantages of the improved pet feeding and watering apparatus will be readily apparent to those of ordinary skill in the art upon reading the following detailed description of presently preferred, but nonetheless illustrative, embodiments of the improved pet feeding and watering apparatus when taken in conjunction with the accompanying drawings.

In this respect, before explaining the current embodiments of the improved pet feeding and watering apparatus in detail, it is to be understood that the pet feeding and watering apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pet feeding and watering apparatus. It is therefore important that the claims be regarded as including such equivalent constructions insofar as they do not depart from the spirit and scope of the pet feeding and watering apparatus. It is also to be understood that the phraseology and terminology employed herein are for purposes of description and should not be regarded as limiting.

DETAILED DESCRIPTION OF THE DRAWINGS

Figure 1:
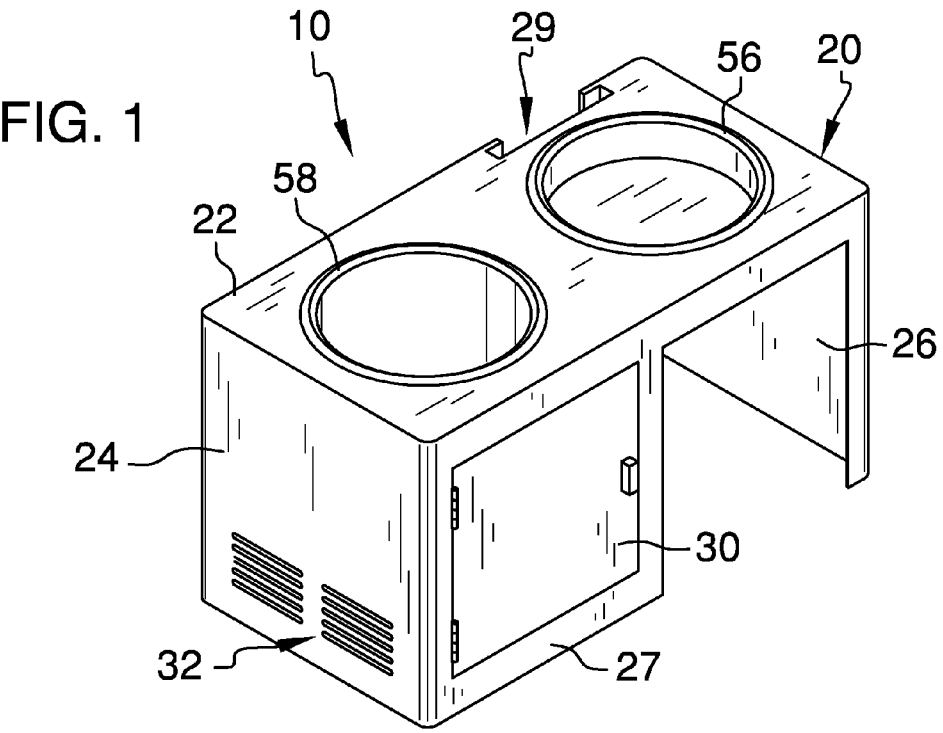
FIG. 1 is a front perspective view.
Figure 2:
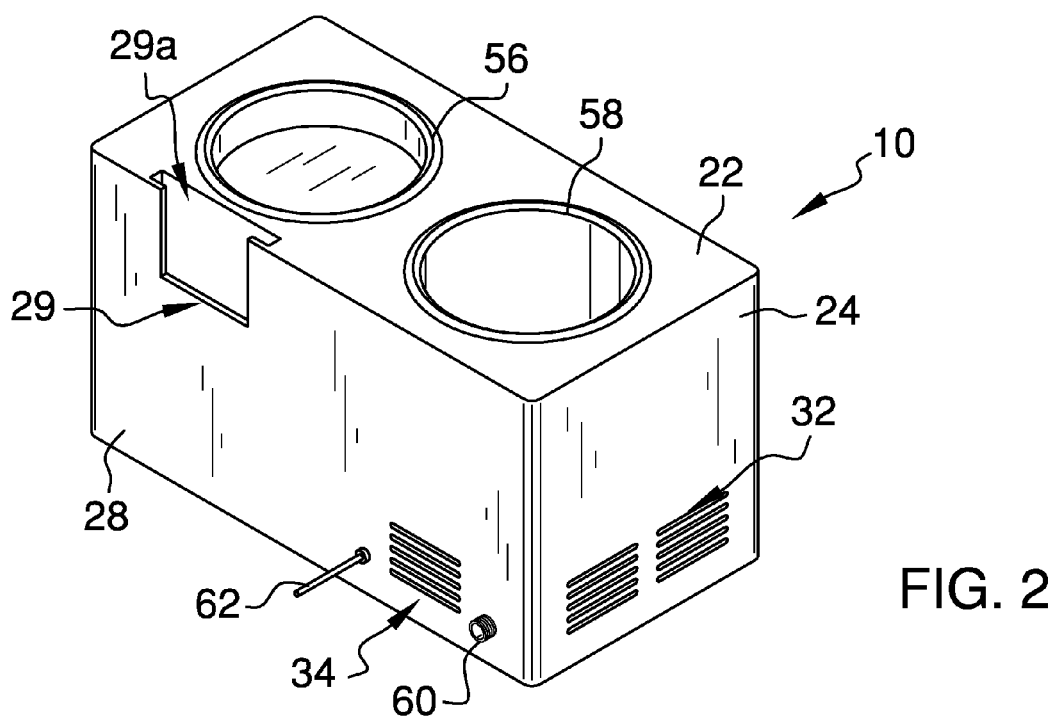
FIG. 2 is a rear perspective view.
Figure 3:
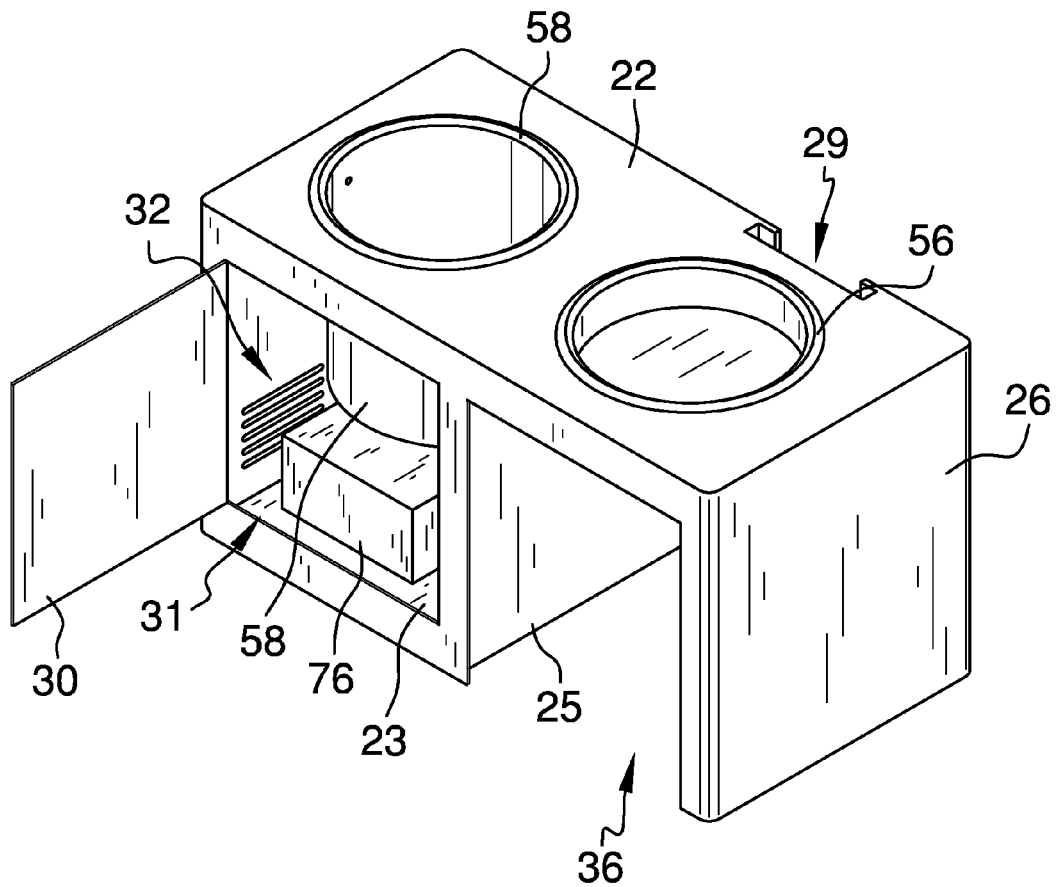
FIG. 3 is a front perspective view, door open.
Figure 4:
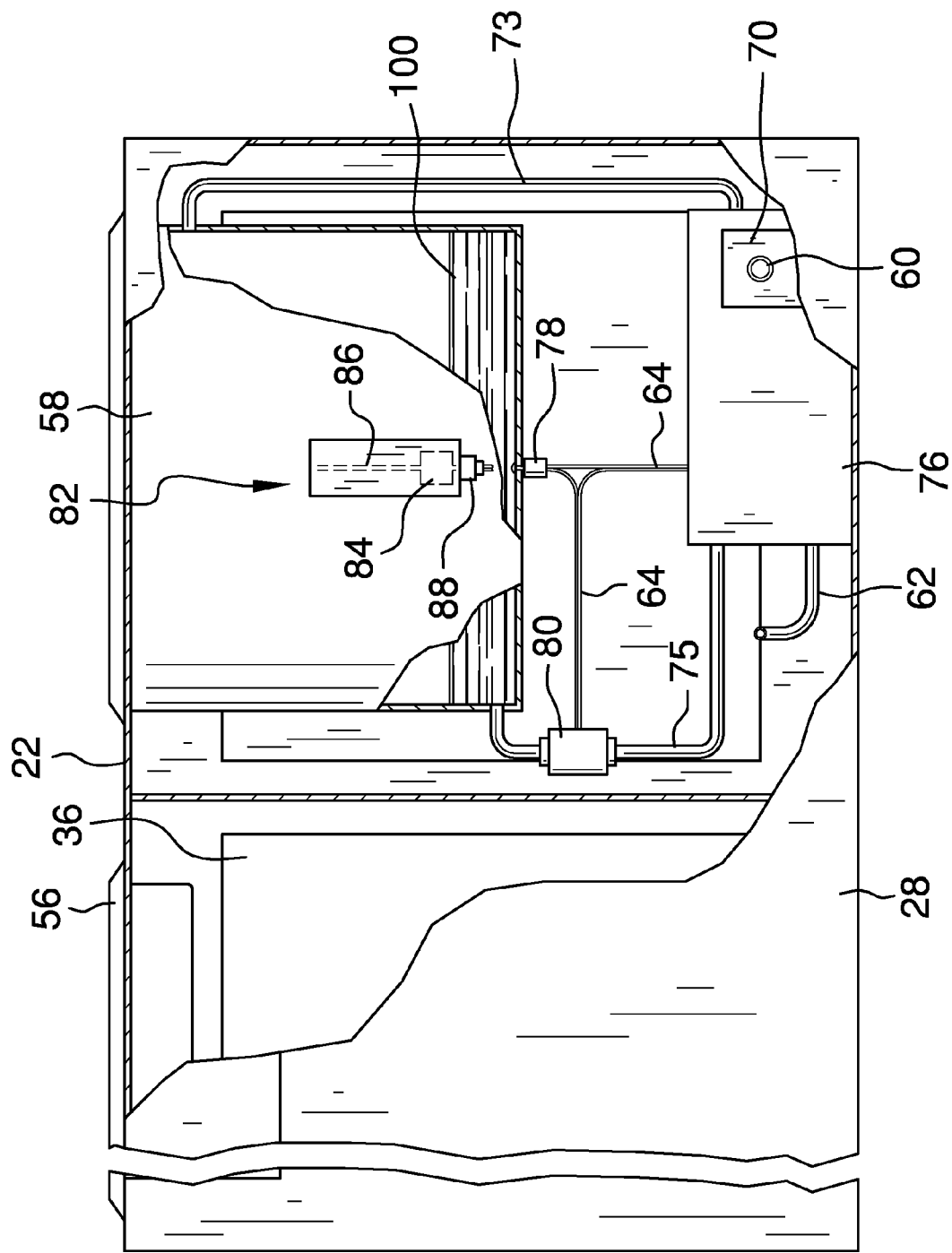
FIG. 4 is a rear cross sectional view.
Figure 5:
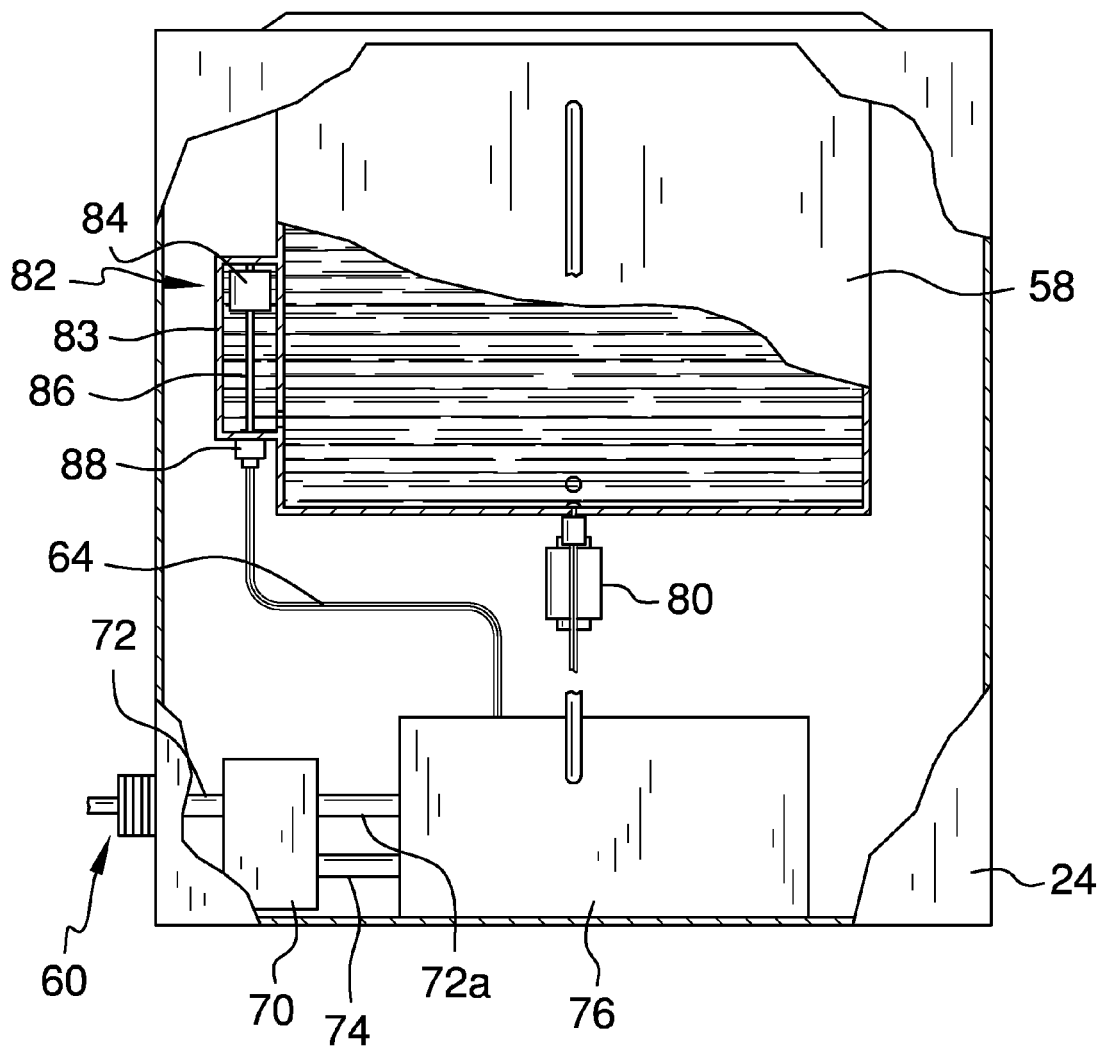
FIG. 5 is an end cross sectional view.

With reference now to the drawings, and in particular FIGS. 1 through 7 thereof, the principles and concepts of the pet feeding and watering apparatus generally designated by the reference number 10 will be described.

Referring to FIGS. 1, 2, 3, 5, and 6, the pet feeding and watering apparatus 10 provides for automatically watering a pet, while keeping the water 100 chilled to a selected temperature. The apparatus 10 also provides a timer 49 operated feeding assembly 40 with food chute 48 which supplies a food bowl 56. Timer 49 activates a rotating measuring cup (not shown) for delivery of food into food bowl 56. The food bowl 56 is disposed within the cabinet 20 top 22 such that a pet cannot remove the food bowl 56. The cabinet 20 is comprised of a first end panel 24 spaced apart from an inner panel 25. The front panel 27 connects the first end panel 24 and the inner panel 25. The second end panel 26 is spaced apart from the inner panel 25. The back panel 28 and top 22 connect to all panels. The closet 31 is disposed between the first end panel 24, the inner panel 25, the back panel 28, and the front panel 27. The double louvers 32 are disposed proximal to the bottom of the first end panel 24. The back louvers 34 are disposed in the back panel 28. The 2 sets of louvers ensure adequate ventilation for the chiller with pump 76. The hinged door 30 is disposed behind the front panel 27 within the closet 31. The cavity 36 is disposed between the inner panel 25 and the second end panel 26. The cavity 36 provides a storage area or a shelter for a pet. The food bowl 56 is removably disposed above the storage cavity 36.

The water reservoir 58 is disposed within the top 22 and within the closet 31. The closet 31 further comprises the bottom 23. The chiller with pump 76 is disposed upon the bottom 23 of the closet 31. The power supply 62 is in communication with the chiller with pump 76. The water inlet 60 is disposed within the back panel 28. The filter 70 is disposed within the closet 31 between the water inlet 60 and the chiller 76. The first supply line 72 connects the water inlet 60 and the filter 70. The second supply line 72a connects the filter 70 to the chiller 76. The first recirculation line 74 connects the chiller 76 to the filter 70. The fill line 73 connects the water reservoir 58 and the chiller 76. The float assembly 82 is in communication with the chiller with pump 76 via electrical connection 64. The float assembly 82 further comprises the housing 83 affixed to the water reservoir 58. The vertical guide 86 is within the housing 83. The float 84 is slideably disposed on the vertical guide 86. The vertical guide 86 float assembly 82 provides for trouble free long functional life, as opposed to other types of float assemblies which might be used. The float switch 88 is disposed on the bottom of the housing 83. The switch 88 is in communication with the chiller with pump 76. The chiller with pump 76 fills the reservoir 58 with water 100 upon signal from the float switch 88 of an insufficient level of water 100 within the reservoir 58. The second recirculation line 75 connects the chiller 76 and the water reservoir 58. The switched valve 80 is disposed within the second recirculation line 75. The thermostat 78 is in communication with water 100 within the water reservoir 58. The thermostat 78 operates the switched valve 80 and the chiller with pump 76.

The water 100 is recirculated between the filter 70, the chiller with pump 76, and the water reservoir 58 upon a signal from the thermostat 78 that the water 100 is not cool enough. The thermostat 78 setting is adjustable.

Figure 6:
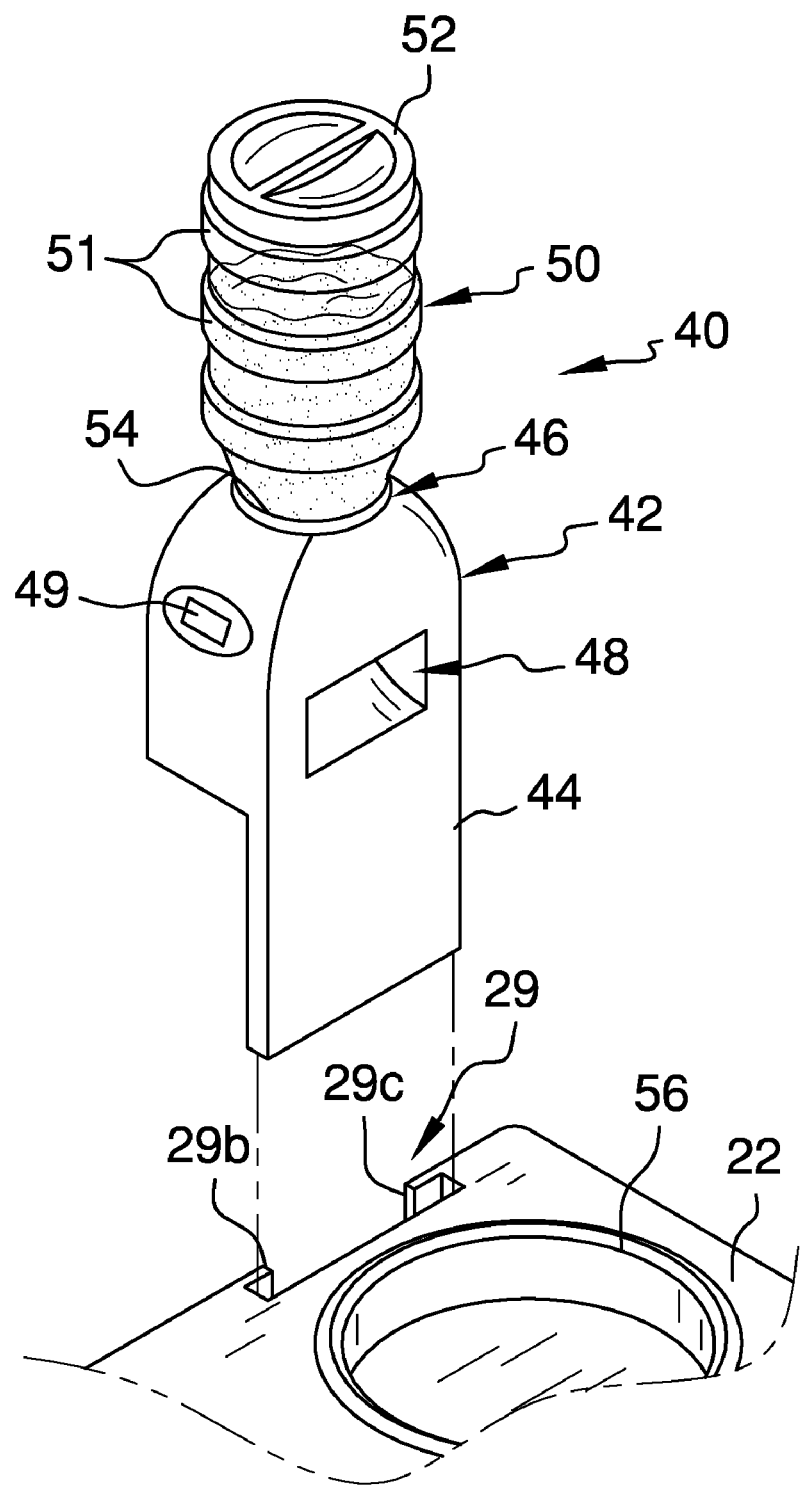
FIG. 6 is a perspective view of the feeding assembly, removed from the cabinet.
Figure 7:
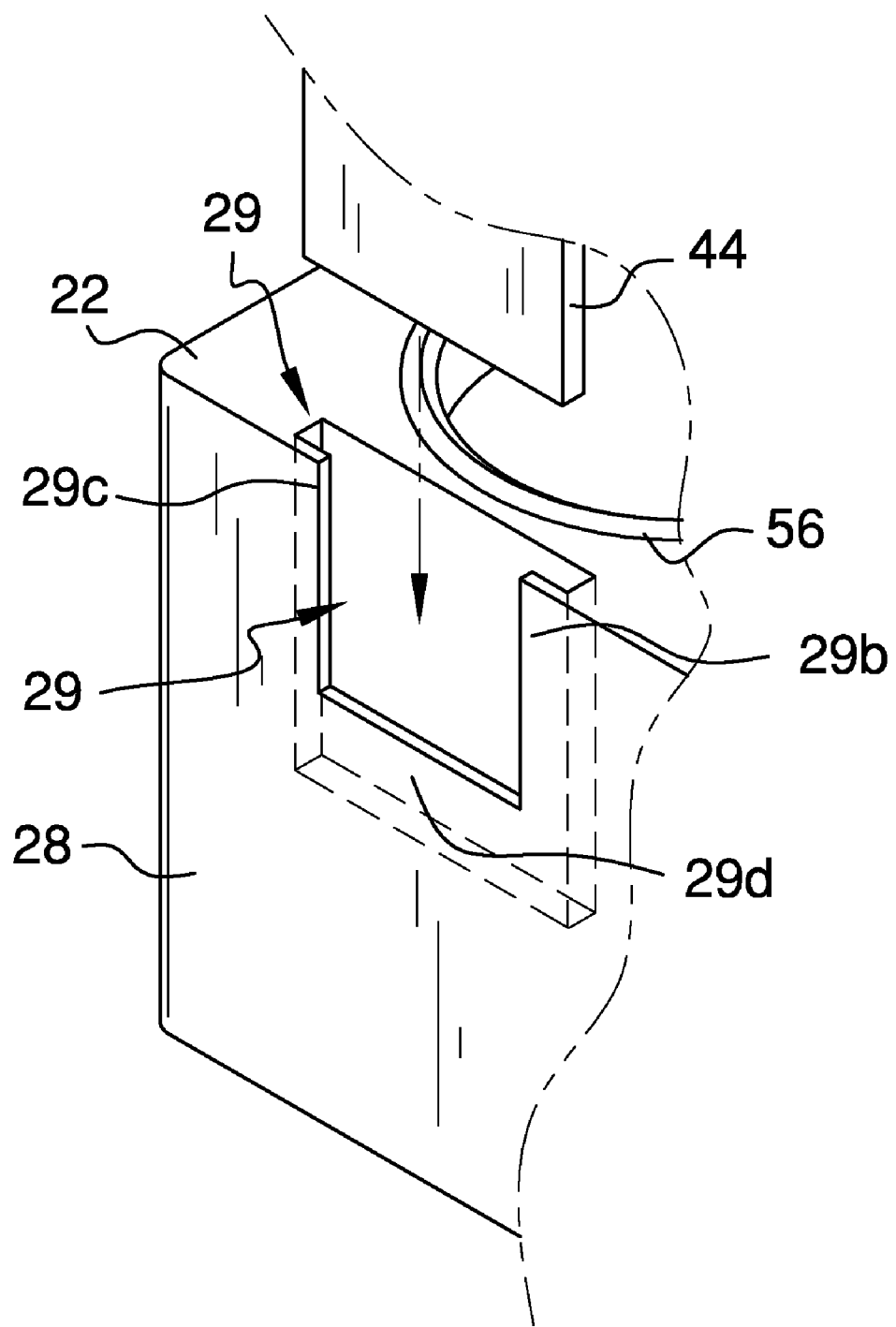
FIG. 7 is a perspective view of the cabinet notch, vertical panel removed.

Referring to FIGS. 6 and 7, the vertical notch 29 is disposed in the top 22 and the back panel 28 of the cabinet 20. The notch 29 partially comprises the notch opening 29a. The first lateral retainer 29b is spaced apart from a second lateral retainer 29c, with each bordering a side of the notch 29, respectively. The bottom retainer 29d borders the bottom of the notch 29. The notch 29 makeup negates an animal lifting the vertical member 44 from the notch 29 while at the same time providing easy removal of the feeding assembly 40 by a human. The feeding assembly 40 comprises the base 42 with receiver 46 in the top of the base 42. The canister 50 has a canister top 52 spaced apart from the canister bottom 54. The bottom 54 is removably fitted within the receive 46 of the base 42. The canister 50 further comprises a plurality of spaced apart horizontal convolutions 51 which strengthen the canister 50 and also make the canister 50 easy to handle, especially in large embodiments. The canister 50 is removed for filling with pet food. The timer 49 is disposed on the base 42. The chute 48 is in communication with the receiver 46. The chute 48 delivers pet food upon delivery button 49 depression. The vertical member 44 is on the bottom of and extends downwardly from the base 42.

With respect to the above description then, it is to be realized that the optimum dimensional relationships for the parts of the pet feeding and watering apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pet feeding and watering apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pet feeding and watering apparatus may be used.

Therefore, the foregoing is considered as illustrative only of the principles of the pet feeding and watering apparatus. Further, since numerous modifications and changes will readily occur to those skilled in the art, it is not desired to limit the pet feeding and watering apparatus to the exact construction and operation shown and described, and accordingly, all suitable modifications and equivalents may be resorted to, falling within the scope of the pet feeding and watering apparatus.

What is claimed is:

1. A pet feeding and watering apparatus, comprising, in combination:
   a cabinet comprised of a first end panel spaced apart from an inner panel, a front panel connecting the first end panel and the inner panel, a second end panel spaced apart from the inner panel, a back panel, a top connected to all panels, a closet between the first end panel, the inner panel, the back panel, and the front panel;
   a double set of louvers disposed proximal to a bottom of the first end panel;
   a single set of louvers disposed proximal to a bottom of the back panel;
   a hinged door within the front panel, accessing the closet;
   a cavity between the inner panel and the second end panel;
   a food bowl removably disposed within the top, the food bowl above the cavity;
   a water reservoir disposed within the top and the closet;
   a closet bottom in the closet;
   a chiller with pump disposed upon the closet bottom;
   a power supply in communication with the chiller with pump;
   a water inlet disposed within the back panel;
   a filter disposed within the closet, the filter between the water inlet and the chiller with pump, a first supply line connecting the water inlet and the filter, a second supply line connecting the filter to the chiller;
a first recirculation line connecting the chiller to the filter;
a fill line connecting the water reservoir and the chiller;
a float assembly in communication with the chiller with pump, the float assembly further comprising:
  a housing affixed to the water reservoir;
  a vertical float guide within the housing;
  a float slideably disposed on the vertical guide;
  a float switch on a bottom of the housing, the switch in electrical communication with the chiller with pump, the chiller with pump filling the reservoir upon a signal from the float switch of a level of a water within the reservoir;
a second recirculation line connecting the chiller and the water reservoir;
a switched valve disposed within the second recirculation line;
a thermostat in communication with water within the water reservoir, the thermostat operating the switched valve and the chiller with pump, the water recirculated between the filter, the chiller with pump, and the water reservoir upon a signal from the thermostat;
a vertical notch disposed in the top and the back panel, the notch comprising:
  a notch opening within the notch;
  a first lateral retainer spaced apart from a second lateral retainer, each retainer bordering a side of the notch, respectively;
  a bottom retainer bordering a bottom of the notch;
a feeding assembly, comprising:
  a base;
  a receiver in a top of the base;
  a canister having a top spaced apart from a bottom, the bottom removably fitted within the receiver, the canister further comprising a plurality of spaced apart horizontal convolutions;
  a timer disposed on the base;
  a chute in communication with the receiver, the chute delivering a pet food to the food bowl upon delivery button depression;
  a vertical member extended downwardly from the base, the vertical member removably fitted within the notch.

* * * * *